United States Patent [19]

Verstegen

[11] 4,187,552

[45] Feb. 5, 1980

[54] READ ONLY MEMORY CHARACTER GENERATOR SYSTEM

[75] Inventor: Brian P. Verstegen, Sunnyvale, Calif.

[73] Assignee: Durango Systems, Inc., Cupertino, Calif.

[21] Appl. No.: 944,082

[22] Filed: Sep. 20, 1978

[51] Int. Cl.$^2$ .............................................. B41J 3/50
[52] U.S. Cl. .................................... 364/900; 400/124
[58] Field of Search ... 364/200 MS File, 900 MS File; 400/124

[56] References Cited

U.S. PATENT DOCUMENTS

| | | | |
|---|---|---|---|
| 3,909,626 | 9/1975 | Balasubramanian et al. | 364/900 |
| 4,020,465 | 4/1977 | Cochran et al. | 364/900 |
| 4,029,190 | 6/1977 | Ragen et al. | 400/124 |
| 4,033,444 | 7/1977 | Beery | 400/124 |
| 4,109,777 | 8/1978 | Ottenstein et al. | 400/124 |

Primary Examiner—Mark E. Nusbaum
Assistant Examiner—C. T. Bartz
Attorney, Agent, or Firm—Thomas E. Schatzel

[57] ABSTRACT

A read only memory character generator system for generating dot print characters of a given font within a nine-column-by-nine-row dot matrix comprising a read only memory having a storage capacity of one byte per row of memory, the memory having a first memory means, a second memory means and a third memory means with the first memory means having nine memory row locations of memory storage devices for each character of the font to be printed, the memory storage devices at each successive row for each character being burned in pursuant to the dot matrix pattern for successive columns of dots of not more than eight rows for that given column of that given character, the second memory means having one memory row location of memory storage devices for each character of the font to be printed with the storage devices at each location being burned in pursuant to the dot matrix pattern for not more than six columns of dots for the ninth row of one of said characters and a binary code representation for the dot matrix pattern of the remaining columns of the ninth row dot matrix pattern for that particular character, and said third memory means having one memory row location of memory storage devices for each of said differing binary code representations with the storage devices at each location being burned in pursuant to the dot matrix pattern representation of one of said binary-coded representations.

7 Claims, 3 Drawing Figures

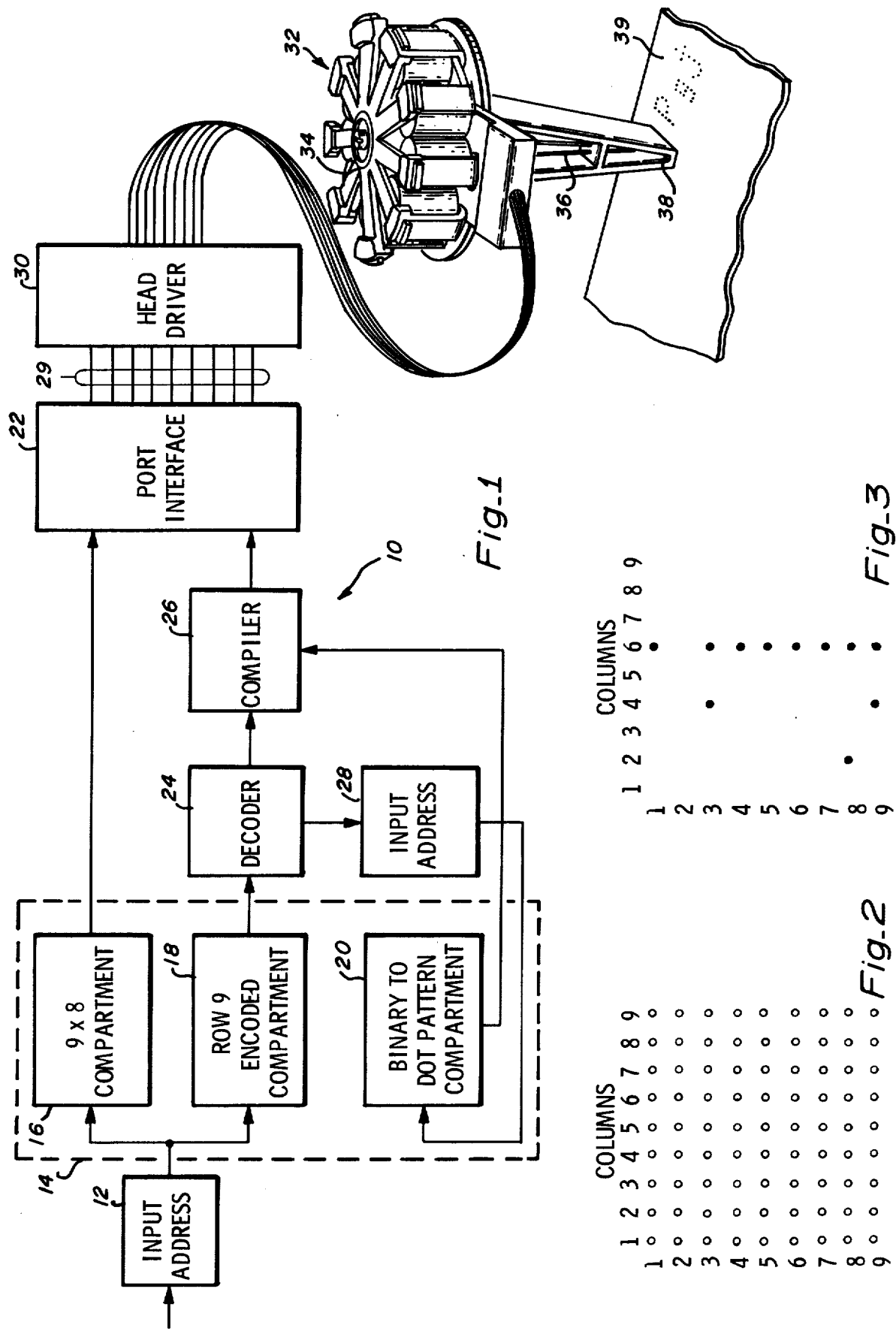

READ ONLY MEMORY CHARACTER GENERATOR SYSTEM

BACKGROUND OF THE INVENTION

1. Field of the Invention

The present invention relates generally to on-line printing apparatus and more particularly to a character generating system for generating characters of a nine-row-by-nine-column dot matrix format.

2. Description of the Prior Art

High-speed line printers are well known in the art, and there are continuous efforts to develop printers to accommodate the high output rate of information which can be delivered by a high-speed data processing systems. Also, print heads which can accommodate high-speed electronics are known in the prior art. For example, printers employing wire matrix ballistic impact print heads capable of providing print characters by an array of dots in rows and columns is well known. For example, such a head is shown and described in U.S. Pat. No. 3,929,214. In order to actuate the print heads utilizing a dot matrix print pattern, it is necessary to have a character generator capable of generating pulse signals representative of the dot pattern of the character to be printed. Such character generators incorporate read only memories. Heretofore, in utilizing a standard read only memory having rows of one byte (eight bits) wide places limitations on the number of dots that can be incorporated for a given character. At the same time, however, by limiting the number of dots limits the resolution of the printed character.

It has been found preferable that the fonts for a dot-printed character be in nine-by-nine dot matrix. That is, the print characters be generated by a combination of dots selected from a rectangular pattern of nine dots per row and nine dots per column. However, this has presented difficulty in view of the fact that memories of rows of one byte have a maximum of only eight bits per row, thus placing a limitation as to the number of available dots in the printing of any given character.

SUMMARY OF THE PRESENT INVENTION

It is an object of the present invention to provide a system for generating dot print characters of a given font within a nine-column-by-nine-row dot matrix wherein zero to nine dots may be used in any columm.

It is a further object of the invention to provide a system for generating dot print characters of a given font within a nine-column-by-nine-row dot matrix wherein the read only memory has rows of one byte.

It is a further object of the present invention to provide a system for generating dot print characters of a given font within a nine-column-by-nine-row dot matrix wherein a single 1K ROM may be utilized to generate all characters of the ASCII font and wherein zero to nine dots are available for any columm of the characters to be printed.

Briefly, the preferred embodiment of the system includes a read only memory of one byte (eight bits) per row of memory with the memory comprising a first compartment part having nine memory row locations for each character of the font to be printed. The memory storage devices at each successive row of the first compartment are burned in pursuant to the dot matrix pattern for successive columns of dots of not more than eight rows for that given column of that given character. The memory has a second compartment part having one memory row location for each character of the font to be printed with the memory storage devices at each location of the second compartment being burned in pursuant to the dot matrix pattern for five columns of dots for the ninth row of a particular character and a binary-coded representation of the dot matrix pattern of the remaining columns of the ninth row of that particular character. The memory means has a third compartment part with one memory row location of each of said differing binary-coded representations. The memory storage devices at each location within the third compartment are burned in pursuant to the dot matrix pattern representative of one of the binary-coded representations. The memory is addressed by an address means which receives input information representative of a character to be printed. The address means in turn addresses the memory row locations of said first and second compartment parts corresponding to the particular character to be printed. A decoder is coupled to the memory means for receiving output of said second compartment part and separating the dot matrix information from the binary-coded information for each character addressed. A second address means is coupled to the output of the decoder for receiving the binary-coded information from the decoder and addressing rows of said third compartment part according to the binary-coded information received. A compiler receives the dot matrix information output of the decoder and the dot matrix information output of said third compartment part, and compiles the received dot matrix information for each location in a single row having successive columns of dot information pursuant to the ninth row dot matrix pattern of the character addressed. A port interface is provided for receiving successive columns of dot matrix information for the addressed character from said first compartment part and said rows of dot matrix information to the addressed character from said compiler. The port interface is adapted to be connected to a driver means for activating a matrix print head responsive to said successive composite columns of compiled dot information for the character addressed.

Accordingly, the present system provides for the generating of dot signals for print characters within a nine-column-by-nine-row dot matrix pattern wherein zero to nine dots may exist in any given row and wherein the read only memory need not have nine bit locations per row.

These and other objects and advantages of the present invention will no doubt become apparent after a reading of the following detailed description of the preferred embodiment which is illustrated in the various figures of the drawing.

IN THE DRAWING

FIG. 1 is a block diagram of a character generating system of the present invention;

FIG. 2 illustrates a dot font for a nine-by-nine matrix; and

FIG. 3 illustrates the dot pattern for the letter "j" utilizing the present system.

DETAILED DESCRIPTION OF THE PREFERRED EMBODIMENT

FIG. 1 depicts in block diagram form a system, referred to by the general reference character 10, for a character generator according to the present invention.

The generator 10 generates signals for dot print characters of a given font within a nine-column-by-nine-row matrix and wherein there are not two successive dots in any one row for any given character. Thus, for characters printed pursuant to the system 10 there is always at least one non-dot space intermediate any two dots within a given row for any character. The restriction of nonadjacent dots in a row is consistent with the restriction of dot matrix print heads and the fact that the recovery time for dot matrix printer heads is such that a given styli cannot print dots in successive rows where the resolution is of the order of a nine-by-nine dot matrix with ten characters per inch at high print speeds; e.g., 165 characters per second. Accordingly, the system 10 takes advantage of this restriction as hereinafter described in greater detail.

The system 10 includes an input address network 12 for receiving electrical information representative of the characters to be printed. The network 12 receives its input from a data processing system generating signals indicating the characters to be printed. The network 12, responsive to the input intelligence addresses a read only memory 14 which has single byte rows. The memory 14 is divided into three compartments designated as a nine-column-by-eight-row compartment 16, a row-nine-encoded compartment 18 and a binary-to-dot pattern compartment 20, all of which will be described in detail. The output of the memory compartment 16 is delivered to a port interface 22. The output of the row-nine-encoded memory compartment 18 provides input to a decoder 24. Decoder 24 is input to a compiler 26 and to an input address network 28. The address network 28 is input to the binary-to-dot pattern memory compartment 20. The output of the compiler 26 is tied to the port interface 22.

The port interface 22 is adapted to provide pulse signals on nine individual lines within a bus 29. The bus 29 extends to a head driver network 30, the output of which may be extended to a matrix print head referred to by the general reference character 32. The illustrated head 32 comprises nine individual electromagnetic actuators 34, each of which drives one of nine styli 36. The nine styli 36 are provided in a straight line configuration at the point 38 adjacent to the interface with a print medium 39 on which the addressed character is to be printed. As illustrated, each of the styli 36 provides a dot on the print medium when its electromagnetic member 34 is actuated. With the needles being aligned at the point of interface with the print medium, an entire column of up to nine dots, or any combination thereof, may be printed at one time if the character print format demands such. If the particular print format for that character does not demand all dots of the column, then only those styli coinciding with the dots which are demanded for the particular column location within the matrix are actuated.

For illustrative purposes and discussion of the structure of FIG. 1, there is shown in FIG. 2 a font of a nine-column-by-nine-row dot matrix from which all print characters are derived. For example, FIG. 3 illustrates the dots which are printed to realize a "j" print character.

For illustrative purposes, assume that the print system 10 is designed to print the characters of the ASCII (American Standard Code for Information Interchange) table. The printable characters of the ASCII table are approximately 96 in number. Though a 1K ROM with rows of memory storage devices of one byte in length may be utilized, the rows in the memory being of one byte length have a maximum of eight bits whereas it is necessary to have nine bits to accommodate the nine-by-nine pattern. Thus, according to the present invention the memory is divided up into the first compartment part 16 which has an address entry for each potential character to be printed. For example, in the present illustration there will be 96 address entries for the various available characters. Intermediate each address entry on the first compartment of the memory will be nine rows with the successive rows from the point of entry to the next point of entry being representative of the dot pattern for the columns 1-9, respectively, of the character addressed. For example, for the address "j" the first row of memory storage devices of the memory part 16 will be burned in to coincide with the column 1 dot format for the character. As illustrated in FIG. 3, there will be no dots in column 1, so therefore none of the elements in row 1 at the address "j" will be burned in to produce a dot. However, for column 2 of the dot matrix for the character "j", there is a dot at row 8. Accordingly, the second row of memory storage elements in compartment 16 for the address corresponding to "j" will have the memory element in column 8 burned in to produce a dot signal when addressed. As to the third column of the dot matrix for the letter "j", there are no dots so the third row of memory storage elements for the address "j" of the memory compartment 16 will have no elements burned in to produce a dot signal. Referring now to column 4 of the dot matrix for the letter "j", it indicates dots at rows 3 and 9. Accordingly, for the fourth row of memory storage elements in compartment 16 for the address "j", the third memory element will be burned in to produce a dot signal when addressed. However, since the rows of memory are only one byte in width, there is no memory storage element in compartment 16 to accommodate row 9 of the dot pattern. However, it is accomplished in memory 14 as hereinafter described.

Again referring to FIG. 3, column 6 of the dot matrix for the character "j" calls for dots in rows 1 and 3-9. Accordingly, row 6 of the memory storage elements of the compartment 16 will be burned in such that the memory elements in columns 1 and 3-8 will all generate a dot signal when addressed. Again, since there is no ninth element, row 9 of the dot matrix cannot be accommodated in compartment 16. For columns 7, 8 and 9 of the dot matrix for the letter "j", there are no dots so none of the elements in rows 7-9 of the memory compartment 16 for the character "j" will be burned in to produce dot signals. Thus, when the memory 14 is addressed for the letter "j", the memory compartment 16 provides digital pulse signals out to the port interface representative of the nine successive columns of dots for rows 1 through 8 of the dot pattern for the character "j" as illustrated in FIG. 3 being in succession.

Now referring to the row 9 information for the dot print matrix, it will be recalled that there is a restriction in that there are not successive columns of dots for a character due to the inherent limitation of the recovery time of the matrix print heads. Accordingly, there can never be nine dots in row 9 for any printed character. In fact, five is the most dots that can be in any given row for a printed character. Since the memory 14 is capable of handling eight bits, the row 9 dots are encoded in accordance with a binary system. For example, the first five columns of memory storage elements of any row for an addressed character may be burned in in accordance with the first five columns of dot information for row 9 of the character. However, as to the last four columns of dots, since there are never dots in successive columns for a given row, there are only eight possible combinations of dots for the last four columns of row 9 for any character. These eight combinations can be represented by binary numbers which will never exceed three bits in length. This is illustrated by the following table:

TABLE I

| Columns | 1 | 2 | 3 | 4 | 5 | 6 | 7 | 8 | 9 |
|---|---|---|---|---|---|---|---|---|---|
| | X | X | X | X | X | O | O | O | O |
| | X | X | X | X | X | O | O | O | 1 |
| | X | X | X | X | X | O | O | 1 | O |
| | X | X | X | X | X | 1 | O | O | 1 |
| | X | X | X | X | X | O | 1 | O | O |
| | X | X | X | X | X | O | 1 | O | 1 |
| | X | X | X | X | X | 1 | O | 1 | O |
| | X | X | X | X | X | 1 | O | O | O |

POTENTIAL ROW NINE DOT PATTERNS FOR COLUMNS 6-9 OF PRINTED CHARACTERS.

Note:
"O" represents no dots.
"1" represents a printed dot.
"X" represents either dot or no dot.

In burning in the memory storage elements, a code may be used to represent the dot pattern and then decode the output from the memory. Accordingly, the dot pattern for columns 6-9 of the row 9 dot matrix for any character may be represented by a three bit binary encoding.

TABLE II

| Columns | 1 | 2 | 3 | 4 | 5 | 6 | 7 | 8 |
|---|---|---|---|---|---|---|---|---|
| | X | X | X | X | X | 0 | 0 | 0 |
| | X | X | X | X | X | 0 | 0 | 1 |
| | X | X | X | X | X | 0 | 1 | 0 |
| | X | X | X | X | X | 0 | 1 | 1 |
| | X | X | X | X | X | 1 | 0 | 0 |
| | X | X | X | X | X | 1 | 0 | 1 |
| | X | X | X | X | X | 1 | 1 | 0 |
| | X | X | X | X | X | 1 | 1 | 1 |

ROM CODED PATTERN FOR ROW NINE DOT PATTERN OF TABLE I

Note:
"0" represents memory storage device produces a "no dot" representation signal.
"1" represents a "dot" print signal.
"X" represents either dot or no dot.

To accommodate this, the Row 9 encoded compartment 18 of the read only memory 14 has one entry for each of the characters and each entry has one row of memory components. The first five columns of memory storage elements at each location are burned in according to the dot pattern for the Row 9 dots of the character at that particular address. The memory storage elements in columns 6, 7 and 8 for that character are burned in according to the binary code representative of the dot pattern for columns 6-9 for that character. For example, the encoding may be that represented by Table II.

When the memory compartment 18 is addressed for a particular character, it provides a readout according to the Table II format for columns 6-8 of the memory storage devices. This readout is then decoded to convert it to a true representation of the dot pattern for columns 6-9 of that particular character. Accordingly, the output from the Row 9 encoded compartment 18 is received by the decoder 24 which is adapted to strip the first five columns of information apart from the last three columns.

The binary-coded information of the memory devices of columns 6-8 of the memory compartment are delivered to the input address network 28. The input address network 28 is tied to the binary-to-dot pattern compartment 20 of the memory 14. The compartment 20 has eight individual row locations with each location being designated by one of the binary representations for the numerals 1 through 8 as illustrated by Table II. The memory storage elements of columns 5-8 at each of the locations in the compartment 20 are burned in to coincide with the dot pattern equivalent as illustrated in Table I. The output from the memory compartment part 20 is tied to the compiler 26 which is also tied to the decoder 24. Accordingly, for each character the compiler 26 receives signals from the compartment 18 representative of the first five columns of dot pattern for Row 9 of the addressed character address and receives the other four columns of dot information representative of Row 9 of that character from the compartment 20. The compiler then compiles this information and generates on succession signals representative of the complete Row 9 dot pattern. The compiler 26 output is then delivered to the interface 22 where the signals for all nine rows of the addressed character are combined and this information is then generated in successive columns of nine rows each. For example, all of column 1 print information for each of the Rows 1 through 9 of the addressed character is provided at one time on bus 29 followed by the column 2 information, etc. Accordingly, the head driver 30 may then drive the matrix print head 32 and actuate the individual styli 36 representative of the information for the given column of information for the character to be printed.

Accordingly, as indicated, the complete nine-by-nine matrix may be accommodated using an eight-bit wide memory and at the same time not wasting memory space. For example, assuming a 96-character font is used, 864 rows of memory are used for compartment 16 since each character has nine memory rows of information at a maximum. Since compartment 18 has one location for each character, it utilizes 96 rows and compartment 20 utilizes eight locations. Thus, a 1K memory may be burned in to accommodate all 96 characters in a nine-by-nine dot matrix pattern.

It should also be noted that in encoding the Row 9 information, it is not necesssary to limit the dot pattern conversion to binary to four columns of dots. For example, it is possible to encode four, five, six, seven, or all nine of the Row 9 dots with a binary equivalent and compress it within the one byte limitation of the memory.

While, for the sake of clearness and in order to disclose the invention so that the same can be readily understood, a specific embodiment has been described and illustrated, it is to be understood that the present invention is not limited to the specific means disclosed. It may be embodied in other ways that will suggest themselves to persons skilled in the art. It is believed that this invention is new and that all such changes that come within the scope of the following claims are to be considered as part of this invention.

What is claimed is:

1. A system for generating dot print characters of a given font within a nine-column-by-nine-row dot matrix comprising:

a read only memory having memory storage devices arranged in rows and columns with a storage capacity per row of memory, the memory having a first memory means, a second memory means and a third memory means, said first memory means having nine memory row locations for each character of the font to be printed, the memory storage devices at each row location for each character being burned in pursuant to the dot matrix pattern for a partial column of dots of that given character, said second memory means having a memory row location for each character of the font to be printed with the memory storage devices at each location being burned in pursuant to the dot matrix pattern for not more than five columns of dots for a row of one of said characters and a binary-coded representation for the dot matrix pattern of the remaining columns of that row for that particular character, and said third memory means having a memory row location for each of said differing binary-coded representations with the storage devices at each location being burned in pursuant to the dot matrix pattern representative of one of said binary-coded representations;

a first input address means for receiving input information representative of a character to be printed and addressing the memory row locations of said first and second memory means corresponding to the particular character to be printed;

a decoder coupled to the second memory means for receiving the output of said second memory means and separating the dot matrix information from the binary-coded information for each character addressed;

a second address means coupled to the decoder for receiving the binary-coded information from the decoder and addressing rows of said third memory means;

a compiler for receiving the dot matrix information output of the decoder and the dot matrix information output of said third memory means and compiling the dot matrix information for each location in a single row successive column format pursuant to the row dot matrix pattern of the character addressed;

a port interface for receiving successive columns of dot matrix information for the addressed character from said first memory means and said rows of dot matrix information to the addressed character from said compiler, whereby the port interface may be coupled to driver means for activating a matrix print head responsive to successive composite columns of compiled dot information for the character addressed and the print head prints on a print medium in successive columns the dot pattern for the addressed character.

2. A system of claim 1 wherein
said first memory means, said second memory means and said third memory means are all part of the same memory with each being a separate compartment of said memory.

3. A system of claim 1 wherein
said first memory means has eight columns of memory storage devices at each memory row location with the memory storage devices at each memory row location for each character being burned in pursuant to the dot matrix pattern of eight successive rows of dots for a given column of a character.

4. A system of claim 2 wherein
said nine memory row locations for each character are in successive memory row locations coinciding with successive columns of the dot matrix pattern of that given character.

5. A system of claim 4 wherein
said memory storage devices at each location in said second memory means are burned in pursuant to representations of the dot matrix pattern for the ninth row of dots for one of the addressed characters.

6. A system of claim 5 wherein
said memory storage devices at each location in said second memory means are burned in pursuant to the binary code pattern representing at least four columns of the dot matrix pattern for the ninth row of dots.

7. In a printer system for printing out characters of a nine-dot-by-nine-dot print matrix font having an input address means for receiving electrical signals representative of a given character to be printed; a matrix print head means for printing columns and rows of dots with each print column being a combination of zero to nine spaced-apart dots aligned in a column with the number and placement of dots within the column being dependent on the particular character to be printed and with printed dots in successive columns being aligned in rows with no two successive columns of dots in any row for any character; electrical driver means for delivering electrical signals to said matrix print head to actuate the print stylii of the head for each column of each character to be printed; an improved read only memory means responsive to the input address means and for delivering electrical signals for the matrix print head means in a nine-by-nine matrix format for each character address, the memory having a first memory compartment part, a second memory compartment part and a third memory compartment part, said first compartment part having nine memory row locations for each character of the font to be printed with the memory storage elements at each successive row location for each character being burned in pursuant to the dot matrix pattern for successive columns of dots of not more than eight rows for that given column of that given character, said second compartment part having one memory row location for each character of the font with the memory storage elements at each location being burned in pursuant to the dot matrix pattern for not more than five columns of dots for a row of one of said characters and a binary-coded representation for the dot matrix pattern of the remaining columns of dots for that particular character, and said third memory compartment part having one memory row location for each of said differing binary-coded representations, the memory storage elements of each location of said third memory compartment part being burned in pursuant to the dot matrix pattern equivalent to one of said binary-coded representations;

a decoder coupled to the memory means for receiving the output of said second compartment part and separating the dot matrix information from the binary-coded information for each character;

a second address means coupled to the decoder and the third memory compartment part for receiving the binary-coded information for each character from the decoder and addressing a location of said third memory compartment part;

a compiler coupled to said decoder and said memory means for receiving the dot matrix information output of the decoder and the dot matrix information output of said third compartment part and compiling the dot matrix information for each location in a successive column format for the addressed character; and interface means for interfacing the compiled dot matrix information to the electrical driver means.

* * * * *